(12) United States Patent
Tsukagoshi et al.

(10) Patent No.: US 7,796,312 B2
(45) Date of Patent: Sep. 14, 2010

(54) HOLOGRAPHIC RECORDING METHOD AND HOLOGRAPHIC RECORDING APPARATUS (75) Inventors: Takuya Tsukagoshi, Kanagawa (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 1 day.

(21) Appl. No.: 10/584,410
(22) PCT Filed: Dec. 21, 2004
(86) PCT No.: PCT/JP2004/019072
§ 371 (c)(1),
(2), (4) Date: Jun. 26, 2006
(87) PCT Pub. No.: WO2005/066877
PCT Pub. Date: Jul. 21, 2005

(65) Prior Publication Data
US 2007/0153345 A1   Jul. 5, 2007

(30) Foreign Application Priority Data
Jan. 6, 2004   (JP) .............................. 2004-000801

(51) Int. Cl.
G03H 1/04 (2006.01)
G03H 1/10 (2006.01)
G02B 5/32 (2006.01)
(52) U.S. Cl. .............................. 359/21; 359/10; 359/35
(58) Field of Classification Search .................... 359/10
See application file for complete search history.

(56) References Cited
U.S. PATENT DOCUMENTS
6,181,665 B1 * 1/2001 Roh ............................ 369/103
6,806,982 B2 * 10/2004 Newswanger et al. ......... 359/35
6,909,529 B2 * 6/2005 Curtis .......................... 359/30

(Continued)

FOREIGN PATENT DOCUMENTS
| JP | A 62-283385 | 12/1987 |
| JP | A 6-247083 | 9/1994 |
| JP | A-07-049648 | 2/1995 |
| JP | A-11-345430 | 12/1999 |
| JP | A-2002-236441 | 8/2002 |
| JP | A-2003-263749 | 9/2003 |

OTHER PUBLICATIONS

Geoffrey W. Burr et al., "Gray-scale data pages for digital holographic data storage", Optics Letters, vol. 23, No. 15, pp. 1218-1220, Aug. 1, 1998.

C.M. Jefferson et al., "IBM Holographic Digital Data Storage Test Platforms", Springer Verlag, pp. 369-381, 2000.

*Primary Examiner*—Stephone B Allen
*Assistant Examiner*—Jade R Chwasz
(74) *Attorney, Agent, or Firm*—Oliff & Berridge PLC (57) ABSTRACT A holographic recording apparatus 10 realizes multilevel gray-scale recording by: controlling a reflection type spatial light modulator (DMD 18D) via a control unit 24 so that an object beam in an object optical system 18 is reflected in an exposure direction so as to be incident on a holographic recording medium 16 or in a non-exposure direction so as not to be incident thereon selectively pixel by pixel in accordance with a data page to be recorded; and making (N+1) levels of gradation exposure with a single exposure time $t_1$ given by dividing $t_0$ by N, where $t_0$ is an exposure time necessary for rendering a single pixel of the data page as an ON pixel, and N is an integer of not less than 2.

13 Claims, 7 Drawing Sheets

U.S. PATENT DOCUMENTS

2001/0013959 A1* 8/2001 Long .............................. 359/2
2003/0117615 A1* 6/2003 Mui ........................... 356/121
2003/0184843 A1* 10/2003 Moon et al. .................. 359/290
2004/0114204 A1* 6/2004 Klug et al. .................... 359/15

\* cited by examiner

HOLOGRAPHIC RECORDING METHOD AND HOLOGRAPHIC RECORDING APPARATUS

TECHNICAL FIELD

This invention relates to a holographic recording method and an apparatus for irradiating a holographic recording medium with an object beam and a reference beam so that a data page is recorded on a recording layer of the same in the form of interference fringes.

BACKGROUND ART

This kind of holographic recording method and apparatus includes ones in which digital information to be recorded is converted into a two-dimensional bitmap pattern and this pattern is given to an object beam through light intensity modulation so that it is recorded as a data page.

Here, the bitmap pattern is typically rendered in light intensity modulation by using a spatial light modulator. Since this spatial light modulator is low in recording density as long as it intensity-modulates the object beam in two levels of ON and OFF pixel by pixel, attempts have conventionally been made to improve the recording density and data rate by means of a gray scale (so-called multilevel recording).

Among the methods of creating a gray scale as mentioned above are one for dividing the contrast of the intensity modulation, one for dividing exposure time, and one combining these.

Moreover, as described in G. W. Burr et al., Opt. Lett. 23 (15) 1218 to 1220 (1998), a gray scale such as mentioned above can be applied not only to bit-by-bit digital data recording such as in DVD (Digital Versatile Disc), but also to page type data such as that of a holographic memory.

Furthermore, since a laser beam emitted from a laser light source typically has a near Gaussian intensity distribution within its beam diameter, an object beam to be propagated through an object optical system also has a Gaussian distribution.

Figure 9:
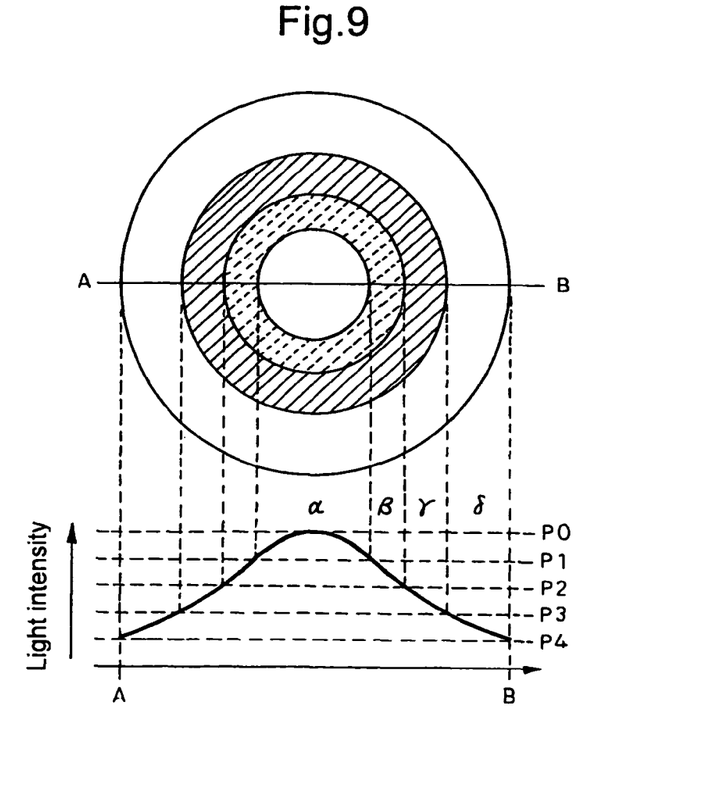
FIG. 9 is a diagram showing a light intensity distribution of typical laser light within its beam diameter.

Consequently, the object beam immediately after intensity-modulated by the spatial light modulator decreases in intensity with increasing distance from the beam center as shown in FIG. 9.

When such an object beam is used to record a data page on a holographic recording medium, a similar image is reproduced by an image pickup device at reproduction time. This requires that the superimposed Gaussian distribution be electrically corrected after the detection of the image.

Nevertheless, since image pickup devices have fixed noise independent of detection intensity, there is the problem that emphasizing darkened pixels can also emphasize the fixed noise with a drop in the SNR of the image.

In this respect, there has heretofore been proposed a technique called apodization in which the object beam is shaped before irradiation from the spatial light modulator, as described in H. J. Coufal et al., "Holographic Data Storage," Springer-Verlag (2000), pp. 369-381.

With the method of dividing the contrast of intensity modulation, which is one of the methods of creating a gray-scale mentioned above, the spatial light modulator, or the means for intensity modulation, is limited to devices of polarization control type (such as a liquid crystal display). Spatial light modulators of direct reflection type like a DMD (Digital Micromirror Device: Tread Mark) cannot be used.

A second problem of this method consists in that the gradation display requires fidelity of high precision. The image transfer from the spatial light modulator to the image pickup device also requires a pixel-by-pixel resolution. Afterimages and blurs of liquid-crystal spatial light modulators thus have a significant impact on crosstalk between the gray-scale pixels.

In reality, this method requires that the amounts of light for the pixels to propagate be modulated at high speed. This means the problem that devices containing analog elements such as liquid crystals cannot follow the high speed operation but be affected by afterimages and blurs.

Moreover, the apodization technique described in H. J. Coufal et al. above is one for redistributing beam intensities of Gaussian distribution into an intensity distribution that is step-functionlike in the radial direction of the beam by using an optical part such as a lens. There is a problem, however, since optical parts are expensive and can limit the degree of freedom of the optical system.

DISCLOSURE OF THE INVENTION

This invention has been achieved in view of the foregoing problems, and it is thus an object thereof to provide a holographic recording method and apparatus which are capable of achieving multilevel gray-scale recording by using a reflection type spatial light modulator that intensity-modulates an object beam in two levels of ON and OFF.

Another object is to provide a holographic recording method and an apparatus which are configured to be capable of apodization without using expensive optical parts.

The inventor has made intensive studies and found that multilevel gray-scale recording can be achieved by dividing exposure time, for example, by using a reflection type spatial light modulator which is made of a digital micromirror device as means for intensity-modulating the object beam.

In Summary, the above-described objectives are achieved by the following embodiments of the present invention.

(1) A holographic recording method for irradiating a recording layer of a holographic recording medium with an object beam and a reference beam through an object optical system and a reference optical system, respectively, so that a data page is recorded thereon in the form of interference fringes, the method comprising: exercising control so that the object beam in the object optical system is reflected in an exposure direction so as to be incident on the holographic recording medium or in a non-exposure direction so as not to be incident on the holographic recording medium selectively pixel by pixel in accordance with the data page to be recorded; and making (N+1) levels of gradation exposure with a single exposure time $t_1$ given by dividing $t_0$ by N, where $t_0$ is an exposure time necessary for exposing an area of the recording layer corresponding to a single pixel of the data page as much as approximately 100%, and N is an integer of not less than 2.

(2) The holographic recording method according to (1), wherein the reflection of the object beam in the exposure direction or in the non-exposure direction is controlled pixel by pixel by using a micromirror device having an array of micromirrors corresponding to the respective pixels of the data page, the micromirrors being switchable and controllable in the direction of reflection.

(3) The holographic recording method according to (1), wherein the object beam is pulsed to make a pulsed exposure for the single exposure time $t_1$ by means of any one of: pulsed light emission from a light source of the object beam and the reference beam; intermittent interruption of an optical path of the object beam; and intermittent interruption of source light of the object beam and the reference beam.

(4) The holographic recording method according to any one of (1), (2) or (3), wherein: a beam intensity distribution of the object beam immediately before the reflection is divided into (N+1) levels of areas; and the number of times of exposure for the time $t_1$ within the exposure time $t_0$ is controlled with respect to each of the areas so that the object beam after the reflection has a generally-uniform beam intensity distribution.

(5) A holographic recording apparatus comprising: a laser light source; a first polarizing beam splitter for splitting a laser beam from this laser light source into an object beam and a reference beam; an object optical system for introducing the object beam to a holographic recording medium; and a reference optical system for introducing the reference beam to the holographic recording medium, wherein the object optical system includes: a second polarizing beam splitter for transmitting or reflecting the object beam; a reflection type spatial light modulator capable of intensity-modulating the object beam transmitted through this second polarizing beam splitter with respect to each of pixels of a data page to be recorded, and reflecting it in an exposure direction toward the second polarizing beam splitter or in a non-exposure direction different thereto selectively; and a quarter-wave plate arranged on an optical path between the second polarizing beam splitter and the reflection type spatial light modulator, the object beam reflected by the reflection type spatial light modulator and the second polarizing beam splitter interferes with the reference beam in the holographic recording medium, and the reflection type spatial light modulator is configured so that it is capable of at least N times of reflection within an exposure time $t_0$, where $t_0$ is the exposure time necessary for exposing an area of the recording layer corresponding to a single pixel of the data page as much as approximately 100%, a single exposure time $t_1$, is given by dividing $t_0$ by N, and N is an integer of not less than 2.

(6) The holographic recording apparatus according to (5), wherein the reflection type spatial light modulator is made of a micromirror device having an array of micromirrors corresponding to the respective pixels of the data page, the micromirrors being switchable and controllable in a direction of reflection.

(7) The holographic recording apparatus according to (5) or (6), wherein the laser light source is configured so that the laser light source is capable of pulsed light emission with generally the same pulse width as the single exposure time $t_1$ of the reflection type spatial light modulator.

(8) The holographic recording apparatus according to (5) or (6), wherein beam interrupting means for transmitting laser light with generally the same pulse width as the single exposure time $t_1$ of the reflection type spatial light modulator and interrupting it between pulses is interposed between the laser light source and the first polarizing beam splitter.

(9) The holographic recording apparatus according to any one of (5) to (8), comprising a control unit for controlling the number of times of exposure within the exposure time $t_0$ with respect to each of the pixels of the reflection type spatial light modulator, and wherein the control unit is configured to control the number of times of exposure within the exposure time $t_0$ pixel by pixel so that a beam intensity distribution after the reflection by the reflection type spatial light modulator becomes generally uniform.

(10) The holographic recording apparatus according to (9), wherein the control unit is configured to control the number of times of exposure so that the object beam after the reflection becomes generally uniform in beam intensity, based on beam intensity distribution information on each area when the beam intensity distribution of the object beam immediately before incident on the reflection type spatial light modulator is divided into (N+1) levels of areas.

BEST MODE FOR CARRYING OUT THE INVENTION

A holographic recording method and an apparatus achieve the foregoing object by: exercising control so that an object beam in an object optical system is reflected in an exposure direction so as to be incident on a holographic recording medium or in a non-exposure direction so as not to be incident thereon selectively pixel by pixel in accordance with a data page to be recorded; and making (N+1) levels of gradation exposure with an exposure time $t_1$ for a single reflection in the exposure direction given by dividing $t_0$ by N, where $t_0$ is an exposure time necessary for rendering a single pixel of the data page as an ON pixel, and N is an integer of not less than 2.

First Embodiment

Hereinafter, a holographic recording apparatus 10 according to a first embodiment of the present invention will be described with reference to FIG. 1.

This holographic recording apparatus 10 is configured to include: a laser light source 12; a first polarizing beam splitter 14 for splitting a laser beam from this laser light source 12 into an object beam and a reference beam; an object optical system 18 for introducing the object beam, or the polarized light transmitted through the first polarizing beam splitter 14 such as p-polarized light, to a holographic recording medium 16; a reference optical system 20 for introducing the reference beam, or the polarized light reflected from the first polarizing beam splitter 14 such as s-polarized light, to the holographic recording medium 16; an imaging optical system 22 for reproducing a data page from diffracted light occurring from the holographic recording medium 16; and a control unit 24.

The object optical system 18 is composed of: a beam expander 18A for expanding the p-polarized light transmitted through the first polarizing beam splitter 14 in beam diameter; a second polarizing beam splitter 18B which is configured to transmit the p-polarized light expanded in beam diameter by this beam expander 18A and reflect s-polarized light; a quarter-wave plate 18C which lies in an optical path of the object beam transmitted through the second polarizing beam splitter 18B and performs $\pi/4$ modulation on the phase of the object beam; a DMD 18D, or a reflection type spatial light modulator, for performing spatial light modulation on the object beam transmitted through this quarter-wave plate 18C by reflecting the incident object beam in a direction for irradiating the holographic recording medium 16 with via the quarter-wave plate 18C and the second polarizing beam splitter 18B (exposure direction) or reflecting it away in another direction (non-exposure direction) with respect to each pixel of the data page; and a Fourier lens 18E which is configured to perform a Fourier transform on the object beam that is reflected from this DMD 18D, transmitted through the quarter-wave plate 18C in the direction opposite from the foregoing, and reflected from the second polarizing beam splitter 18B, and focuses it to near the holographic recording medium 16.

The reference optical system 20 is configured to include a mirror 20A for reflecting the reference beam, or the s-polarized light reflected from the first polarizing beam splitter 14, toward the holographic recording medium 16.

The imaging optical system 22 is configured to include: a mirror 22A for reflecting the diffracted light occurring from the holographic recording medium 16 sideways; an image pickup device 22B; and an imaging lens 22C for imaging the diffracted light reflected from the mirror 22A onto a light receiving surface of the image pickup device 22B.

Next, description will be given of the process by which the holographic recording apparatus 10 records a data page on the holographic recording medium 16.

The laser beam emitted from the laser light source 12 is split by the first polarizing beam splitter 14 into the object beam, or p-polarized light to be transmitted, and the reference beam, or s-polarized light to be reflected.

The reference beam is reflected by the mirror 20A and incident on the holographic recording medium 16 as is s-polarized.

After expanded in beam diameter by the beam expander 18A of the object optical system 18, the object beam is incident on the second polarizing beam splitter 18B, is transmitted as is p-polarized, and reaches the DMD 18D via the quarter-wave plate 18C.

In the DMD 18D, micromirrors are controlled by the control unit 24 pixel by pixel, thereby achieving three levels of gradation display (to be detailed later).

The quarter-wave plate 18C is placed with its optical axis at 45° obliquely to the plane of vibration of the p-polarized light. The object beam reflected in the exposure direction from the DMD 18D is transmitted through the quarter-wave plate 18C, thereby causing a phase shift of $\pi/2$ in total, or a phase shift of $\pi/4$ at the time of incidence on the DMD 18D and a phase shift of $\pi/4$ at the time of reflection, and is incident on the second polarizing beam splitter 18B as s-polarized light.

The second polarizing beam splitter 18B reflects s-polarized light. The s-polarized object beam is thus reflected toward the Fourier lens 18E, Fourier-transformed by the Fourier lens 18E, and converged into a focus near the holographic recording medium 16. Here, it interferes with the reference beam so that a data page is recorded in the form of interference fringes.

The DMD 18D, or reflection type spatial light modulator, is configured to include micromirrors which are switchable and controllable in the direction of reflection. The control unit 24 switches and controls the direction of reflection of each micromirror to either the exposure direction or the non-exposure direction.

Moreover, an exposure time $t_1$, for a single reflection in the exposure direction is given by dividing $t_0$ by an integer N of not less than 2, where $t_0$ is an exposure time necessary for exposing an area of the recording layer corresponding to a single pixel of the data page as much as approximately 100%.

Figure 2:
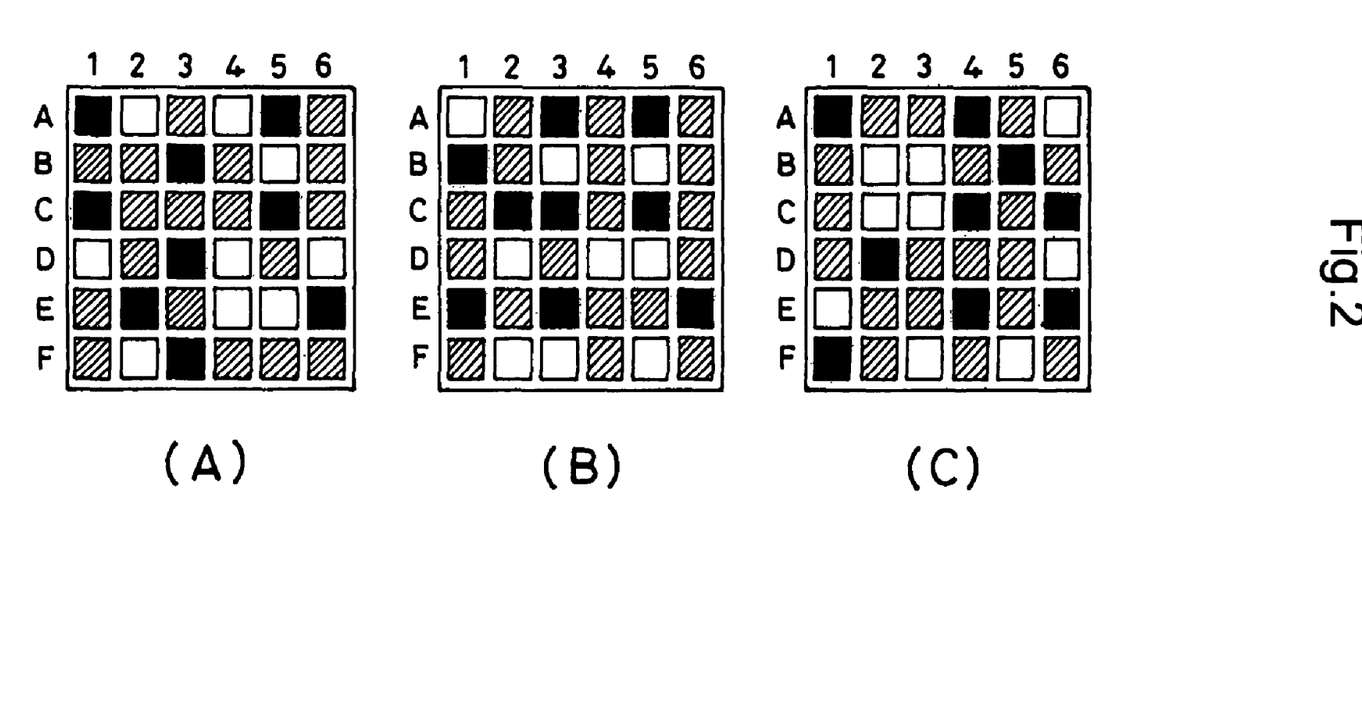
FIG. 2 is a schematic diagram showing examples of data pages to be recorded by the apparatus of the same first embodiment.

Here, the control unit 24 is preset so that the integer N for dividing the exposure time $t_0$ is 2. This consequently allows target values such as shown in FIGS. 2(A) to (C), where the pixels of the bitmap images are displayed in three levels of gradation.

In FIG. 2, white pixels shall display ON pixels for reflecting the object beam toward the second polarizing beam splitter 18B, i.e., in the exposure direction. Black pixels shall display OFF pixels for reflecting the object beam in a direction different from the exposure direction, or interrupting the same. Gray pixels shall display gray-scale pixels in an intermediate level between the two.

Figure 3:
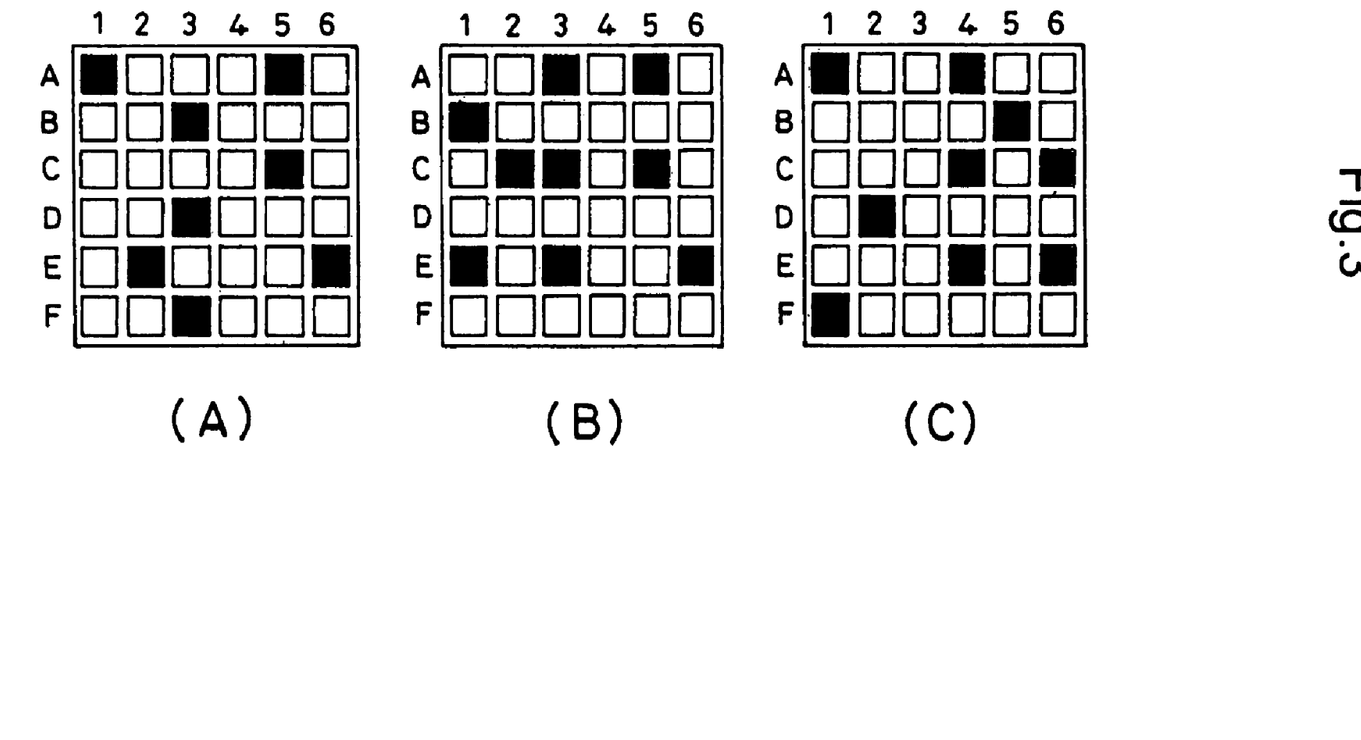
FIG. 3 is a schematic diagram showing the states of exposure reflection and non-exposure reflection of micromirrors at the first time of divided exposure in the DMD of the first embodiment.
Figure 4:
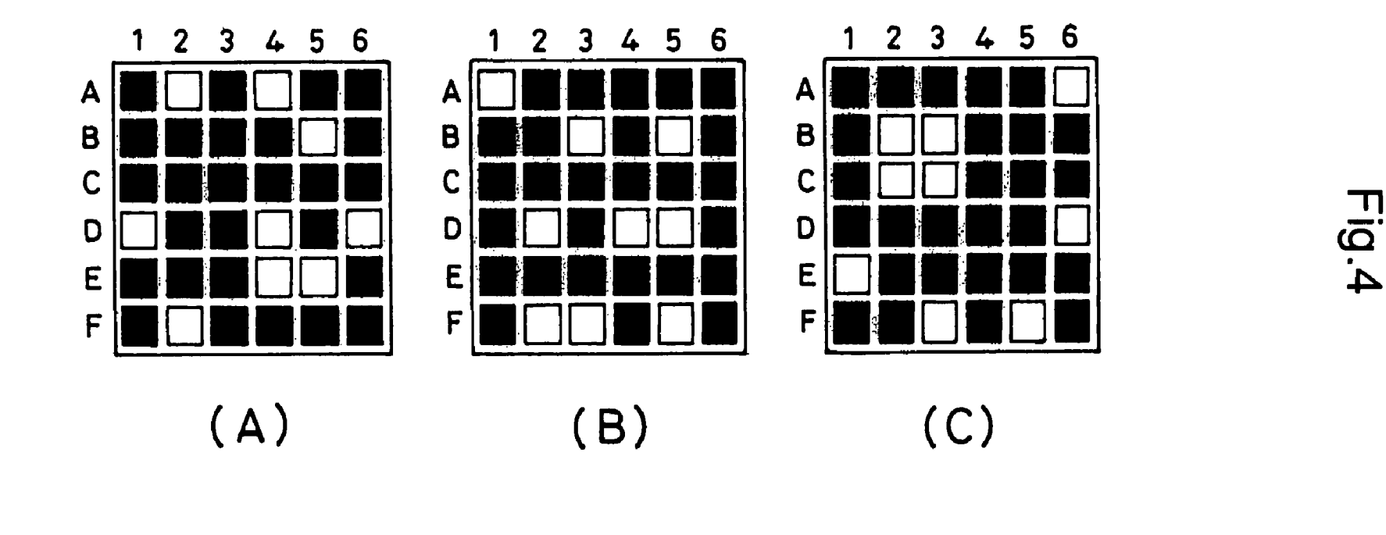
FIG. 4 is a schematic diagram showing the states of exposure reflection and non-exposure reflection at the second time.

In this first embodiment, when the individual pixels are controlled to the target values shown in FIGS. 2(A), (B), and (C) in succession, bitmap images shown in FIG. 3 and bitmap images shown in FIG. 4 are exposed in two separate exposure times so that they are summed up to the states of the bitmap images shown in FIG. 2 (target values).

Figure 5:
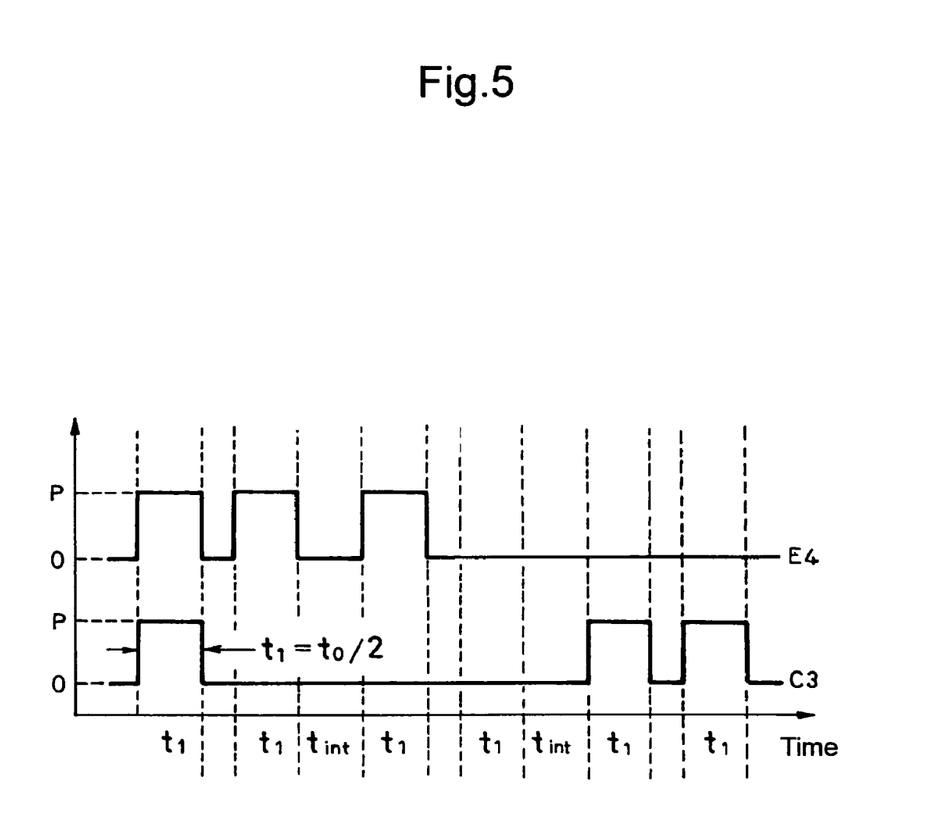
FIG. 5 is a chart for showing along the time axis the process of exposure reflection by certain micromirrors of the DMD.

For example, FIG. 5 shows the relationship between the amounts of light to propagate and the time for the cases of the pixels E4 and C3 in FIG. 2. In FIG. 5, the exposure time $t_1$ is given by $t_1=t_0/2$.

For example, the pixel E4 is exposed the first time for the exposure time $t_1$, as shown in FIG. 3(A), and is exposed the second time in the next exposure time $t_1$, as shown in FIG. 4(A). After a pulse interval time $t_{int}$, it is exposed again for the exposure time $t_1$, as shown in FIG. 3(B), followed by no exposure as shown in FIGS. 4(B), 3(C), and 4(C). This creates the states of an ON pixel, a gray pixel, and an OFF pixel as shown by the pixel E4 in FIGS. 2(A), 2(B), and 2(C), respectively.

The pixel C3 is likewise displayed as a gray pixel, an OFF pixel, and an ON pixel in succession.

It should be appreciated that in the foregoing first embodiment, a single data page is recorded in two exposure times of irradiation since the data page, or data image, is rendered in three tones, or ON pixels, gray pixels, and OFF pixels. If the reproduction data page has an SNR margin, a greater number of tones may be used. More specifically, it is possible to render in N+1 tones, where the single exposure time $t_1$ is given by dividing the exposure time $t_0$ by an integer N of not less than 2.

It should be appreciated that in the bitmap images in the foregoing FIGS. 4 and 5, the holographic recording medium 16 will not be exposed during the times $t_{int}$ from (A) to (B), and from (B) to (C). The object beam may thus be controlled in a pulsed manner if necessary.

Figure 1:
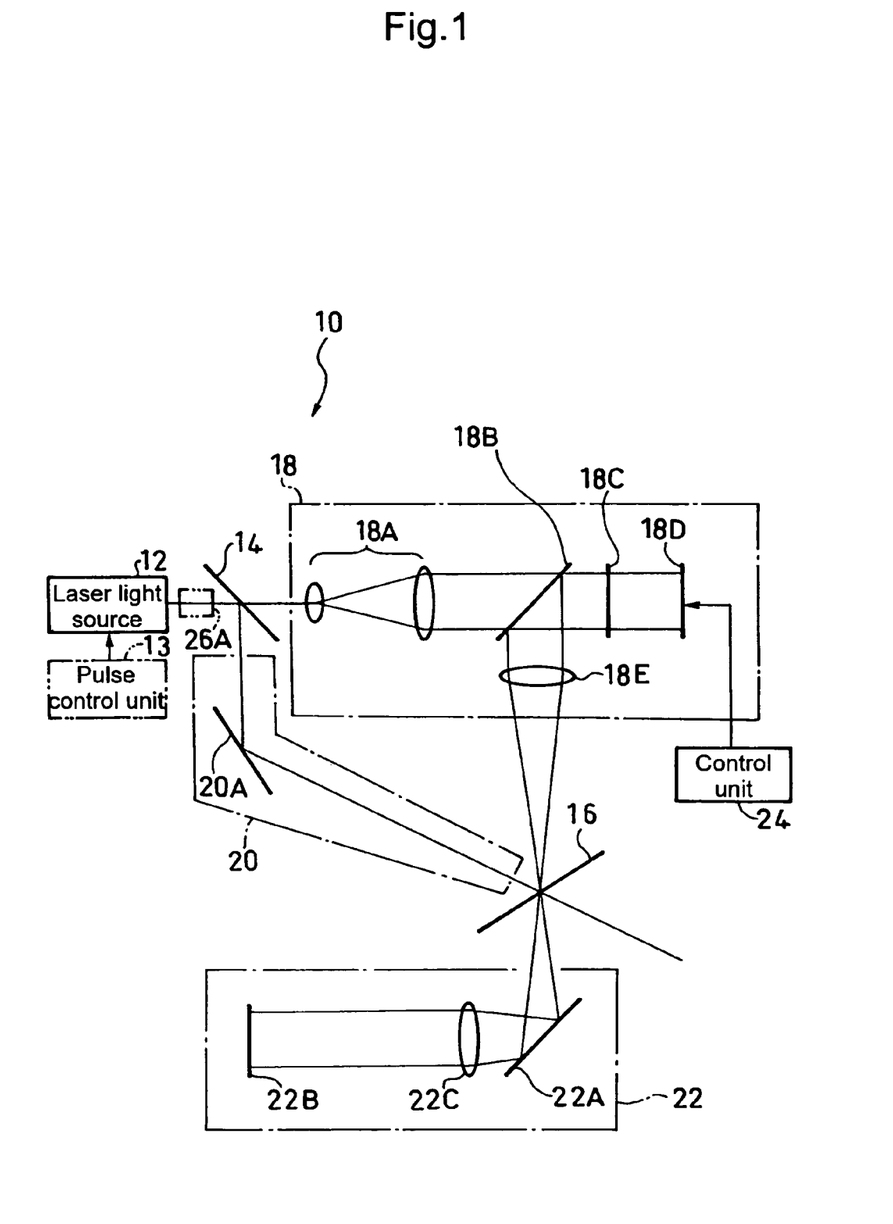
FIG. 1 is an optical system diagram showing a holographic recording apparatus according to a first embodiment of the present invention.

For example, as shown by the numeral 26A in FIG. 1, a pulse control unit 13 for pulse-controlling the laser light source 12 may be provided so that the laser light source 12 emits pulsed light with generally the same pulse width as a single exposure time $t_1$, of the foregoing DMD 18D. In this case, the pulse control unit 13 and the control unit 24 must be synchronized with each other.

Moreover, for example, as shown by a double-dashed line in FIG. 1, beam interrupting means 26A made of an electromagnetic shutter or the like may be interposed between the laser light source 12 and the first polarizing beam splitter 14 or in the object optical system 18 so that it turns ON/OFF the laser light or the object beam in synchronization with the DMD 18D.

It should be appreciated that when the beam interrupting means 26A is arranged immediately after the laser light source 12 or when the pulse control unit 13 controls the laser light source 12 to emit pulsed light, unnecessary exposure to the reference beam can be preferably avoided.

Second Embodiment

Next, a second embodiment of the present invention will be described with reference to FIGS. 6 to 8.

This embodiment relates to a method of uniformizing an intensity distribution when the laser beam emitted from the laser light source has a Gaussian intensity distribution within its beam diameter, by using apodization through the division of the exposure time of a reflection type spatial light modulator without using expensive optical parts.

For example, assuming that the object beam on the optical path immediately before incident on the DMD 18D has such an intensity distribution within its beam diameter as shown in FIG. 9, the amount of light (light intensity) decreases like ($P_0$ to $P_1$)→($P_1$ to $P_2$)→($P_2$ to $P_3$)→($P_3$ to $P_4$) in order of areas $\alpha$, $\beta$, $\gamma$, and $\delta$ from the beam center to the radial outside of the beam diameter.

Corresponding to the areas $\alpha$ to $\delta$ having such respective light intensities, this second embodiment uniformizes the distribution of exposure intensities on the holographic recording medium 16, for example, by setting the number of times of reflection in the exposure direction of the exposure time $t_1$ of the DMD 18D to a small number (one) in area $\alpha$, and increasing it like two, three, and four in areas $\beta$, $\gamma$, and $\delta$ in succession.

To determine these numbers of times of reflection in the exposure direction, for example, the incident side of the DMD 18D is previously measured for an intensity distribution of the object beam. Based on this, weightings such as shown in FIG. 6 are preset in the control unit 24.

More specifically, the difference between the maximum intensity (typically the intensity at the beam center) and the minimum intensity (typically the intensities at four corners of the image) of the beam is divided into four equal parts. Then, it is determined which of the four equally-divided ranges of the amounts of light each pixel on the DMD 18D pertains to.

Figure 6:
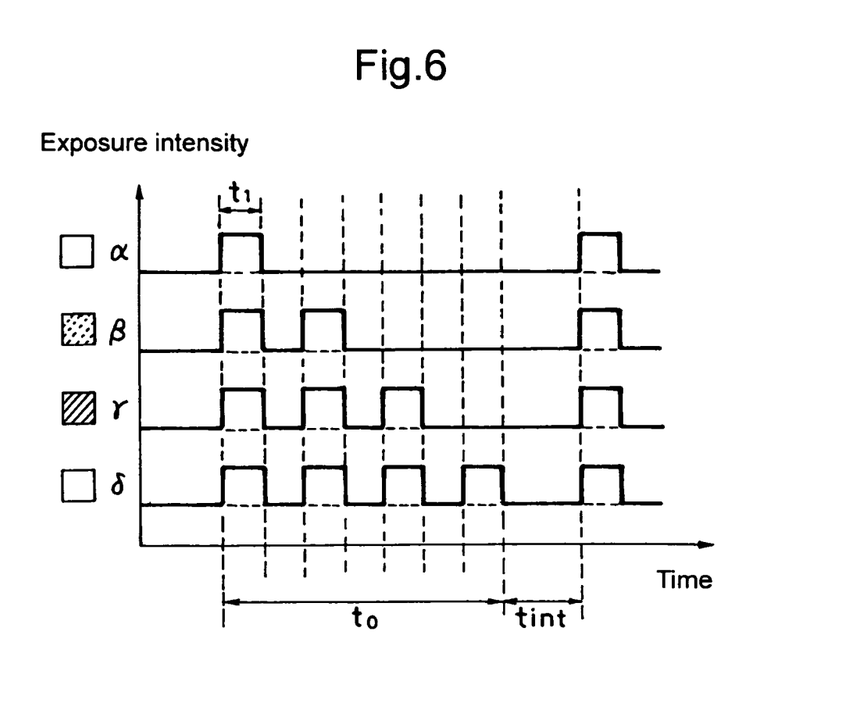
FIG. 6 is a chart for showing a method of apodization according to a second embodiment of the present invention, in relation to exposure intensity and time.

In actual recording where the ON pixels pertaining to the areas $\alpha$ to $\delta$ are displayed as shown in the foregoing FIG. 6 during the modulation on the DMD 18D, they are irradiated with pulsed light having an uniform intensity and pulse width once to four times, respectively, thereby making a holographic recording on the holographic recording medium 16.

Figure 7:
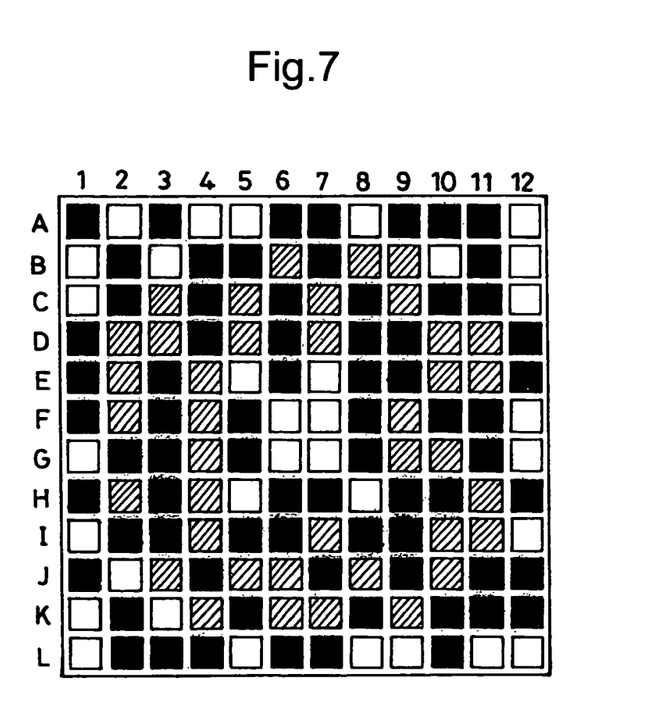
FIG. 7 is a schematic diagram showing the distribution of the amounts of light reflected by the DMD, corresponding to the pixels of a data page when the numbers of times of exposure are adjusted by the method of the same second embodiment.
Figure 8:
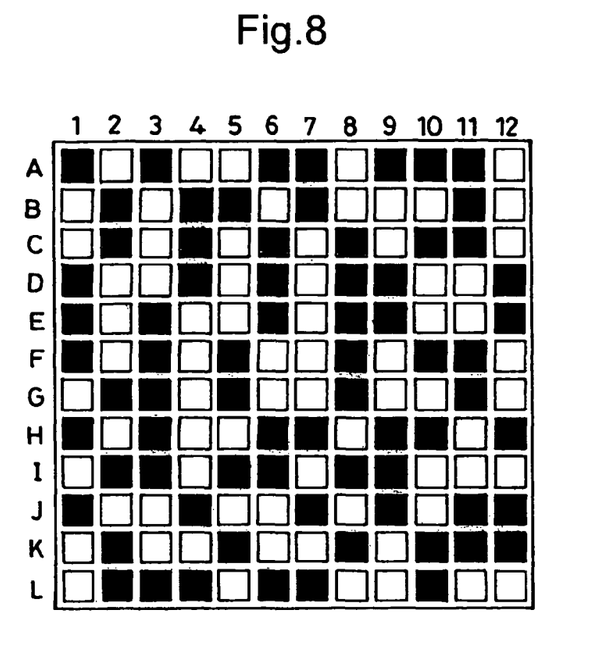
FIG. 8 is a schematic diagram showing an example of a data page recorded by the method of the same second embodiment.

In terms of the gray scale in the foregoing embodiment 1, this is equivalent to recording such an image as shown in FIG. 7. As a result of this, the Gaussian distribution is corrected with the distribution of the numbers of pulses pixel by pixel, so that favorable images containing ON pixels of uniform intensity such as shown in FIG. 8 are obtained.

It should be appreciated that in this second embodiment, the intensity of the object beam per data page decreases as compared to that of apodization using optical parts, whereas it can be compensated by increasing the output of the laser light or increasing the exposure time.

INDUSTRIAL APPLICABILITY

The present invention provides a holographic recording apparatus which can divide an exposure time by using a reflection type spatial light modulator, and control the number of times of exposure of incident object beam pixel by pixel in accordance with the data page to be recorded, thereby achieving multilevel gradation exposure.

The invention claimed is:

1. A holographic recording method for irradiating a recording layer of a holographic recording medium with an object beam and a reference beam through an object optical system and a reference optical system, respectively, so that a data page is recorded thereon in the form of interference fringes, the method comprising:

exercising control of the object optical system between an exposure direction and a non-exposure direction, so that the object beam in the object optical system is reflected in an exposure direction so as to be incident on the holographic recording medium or in a non-exposure direction so as not to be incident on the holographic recording medium selectively pixel by pixel in accordance with the data page to be recorded; recording data pages by N exposures, in which N bit map images are exposed in N separate exposure times so that they are summed up for each data page, at (N+1) levels of gradation with respect to each of the areas of the recording layer corresponding to a single pixel of the data page by the object beam with a single exposure time $t_1$ given by dividing $t_0$ by N, where $t_0$ is an exposure time necessary for exposing one of the areas of the recording layer corresponding to a single pixel of the data page as much as approximately 100%, and N is an integer of not less than 2; and exposing the areas as much as approximately 100% by exposure of N times, as much as 0% by exposure of 0' times and as much as more than 0% and less than 100% by exposure of between 1 and (N−1) times.

2. The holographic recording method according to claim 1, wherein the object beam is pulsed to make a pulsed exposure for the single exposure time $t_1$ by means of any one of:

intermittent interruption of an optical path of the object beam; and intermittent interruption of source light of the object beam and the reference beam.

3. The holographic recording method according to claim 1, wherein the reflection of the object beam in the exposure direction or in the non-exposure direction is controlled pixel by pixel by using a micromirror device having an array of micromirrors corresponding to the respective pixels of the data page, the micromirrors being switchable and controllable in the direction of reflection, and the object beam is pulsed to make a pulsed exposure for the single exposure time $t_1$ by means of any one of:

intermittent interruption of an optical path of the object beam; and intermittent interruption of source light of the object beam and the reference beam.

4. The holographic recording method according to claim 1, wherein:

a beam intensity distribution of the object beam immediately before the reflection is divided into (N+1) levels of areas; and the number of times of exposure for the time $t_1$ within the exposure time $t_0$ is controlled with respect to each of the areas so that the object beam after the reflection has a generally-uniform beam intensity distribution.

5. A holographic recording apparatus comprising:
a laser light source;
a first polarizing beam splitter for splitting a laser beam from the laser light source into an object beam and a reference beam;
an object optical system for introducing the object beam to a holographic recording medium; and
a reference optical system for introducing the reference beam to the holographic recording medium,
wherein the object optical system includes:
a second polarizing beam splitter for transmitting or reflecting the object beam,
a reflection type spatial light modulator capable of intensity-modulating the object beam transmitted through the second polarizing beam splitter with respect to each of pixels of a data page to be recorded, and reflecting it in an exposure direction toward the second polarizing beam splitter or in a non-exposure direction different thereto selectively, and
a quarter-wave plate arranged on an optical path between the second polarizing beam splitter and the reflection type spatial light modulator,
a control unit for controlling the number of times of exposure within the exposure time $t_0$ with respect to each of the pixels of the reflection type spatial light modulator, the control unit controlling the reflection type spatial light modulator between the exposure direction and the non-exposure direction,
the object beam reflected by the reflection type spatial light modulator and the second polarizing beam splitter interferes with the reference beam in the holographic recording medium,
the reflection type spatial light modulator is configured so that it is capable of making N exposures in which N bit map images are exposed in N separate exposure times so that they are summed up for each data page and capable of at most N times of reflection with respect to each of areas of the recording layer within an exposure time $t_0$, where $t_0$ is the exposure time necessary for exposing one of the areas of the recording layer by the object beam corresponding to a single pixel of the data page as much as approximately 100%, a single exposure time $t_1$ is given by dividing $t_0$ by N, N is an integer of not less than 2, and
the reflection type spatial light modulator being further configured to expose the areas as much as approximately 100% by exposure of N times, as much as 0% by exposure of 0 times, and as much as more than 0% and less than 100% by exposure of between 1 and (N−1) times.

6. The holographic recording apparatus according to claim 5, wherein the reflection type spatial light modulator is made of a micromirror device having an array of micromirrors corresponding to the respective pixels of the data page, the micromirrors being switchable and controllable in a direction of reflection.

7. The holographic recording apparatus according to claim 5, wherein the laser light source is configured so that the laser light source is capable of pulsed light emission with generally the same pulse width as the single exposure time $t_1$ of the reflection type spatial light modulator.

8. The holographic recording apparatus according to claim 7, further comprising:
a control unit for controlling the number of times of exposure within the exposure time $t_0$ with respect to each of the pixels of the reflection type spatial light modulator, wherein the control unit is configured to control the number of times of exposure within the exposure time $t_0$ pixel by pixel so that a beam intensity distribution after the reflection by the reflection type spatial light modulator becomes generally uniform.

9. The holographic recording apparatus according to claim 8, wherein the control unit is configured to control the number of times of exposure so that the object beam after the reflection becomes generally uniform in beam intensity, based on beam intensity distribution information on each area when the beam intensity distribution of the object beam immediately before incident on the reflection type spatial light modulator is divided into (N+1) levels of areas.

10. The holographic recording apparatus according to claim 5,
wherein the control unit is configured to control the number of times of exposure within the exposure time $t_0$ pixel by pixel so that a beam intensity distribution after the reflection by the reflection type spatial light modulator becomes generally uniform.

11. The holographic recording apparatus according to claim 10, wherein the control unit is configured to control the number of times of exposure so that the object beam after the reflection becomes generally uniform in beam intensity, based on beam intensity distribution information on each area when the beam intensity distribution of the object beam immediately before incident on the reflection type spatial light modulator is divided into (N+1) levels of areas.

12. The holographic recording apparatus according to claim 10, wherein the control unit is configured to control the number of times of exposure so that the object beam after the reflection becomes generally uniform in beam intensity, based on beam intensity distribution information on each area when the beam intensity distribution of the object beam immediately before incident on the reflection type spatial light modulator is divided into (N+1) levels of areas.

13. A holographic recording method for irradiating a recording layer of a holographic recording medium with an object beam and a reference beam through an object optical system and a reference optical system, respectively, so that a data page is recorded thereon in the form of interference fringes, the method comprising:
exercising control of the object optical system between an exposure direction and a non-exposure direction, so that the object beam in the object optical system is reflected in an exposure direction so as to be incident on the holographic recording medium or in a non-exposure direction so as not to be incident on the holographic recording medium selectively pixel by pixel in accordance with the data page to be recorded;
making N exposures in which N bit map images are exposed in N separate times so that they are summed up for each data page with (N+1) levels of gradation with respect to each of areas of the recording layer corresponding to a single pixel of the data page by the object beam with a single exposure time $t_1$ given by dividing $t_0$ by N, where $t_0$ is an exposure time necessary for exposing one of the areas of the recording layer corresponding to a single pixel of the data page as much as approximately 100%, and N is an integer of not less than 2;
exposing the area as much as approximately 100% by exposure of N times, as much as 0% by exposure of 0 times, and as much as more than 0% and less than 100% by exposure of between 1 and (N−1) times; and
the object beam is pulsed to make a pulsed exposure for the single exposure time $t_1$ by means of pulsed light emission from a light source of the object beam and the reference beam.

* * * * *